(12) United States Patent
Croft

(10) Patent No.: US 6,441,240 B1
(45) Date of Patent: Aug. 27, 2002

(54) METHOD FOR INHIBITING THE DEPOSITION OF WHITE PITCH IN PAPER PRODUCTION

(75) Inventor: Alan P. Croft, Lake Jackson, TX (US)

(73) Assignee: Huntsman Ethyleneamines Ltd., Austin, TX (US)

( * ) Notice: Subject to any disclaimer, the term of this patent is extended or adjusted under 35 U.S.C. 154(b) by 0 days.

(21) Appl. No.: 09/666,035

(22) Filed: Sep. 20, 2000

Related U.S. Application Data

(62) Division of application No. 09/047,803, filed on Mar. 25, 1998, now Pat. No. 6,153,044.

(51) Int. Cl.⁷ .......................... C07C 211/13; D21C 5/02
(52) U.S. Cl. .......................... 564/511; 564/512; 162/5; 162/166; 162/191; 162/199; 162/DIG. 4
(58) Field of Search .................................. 564/511, 512

(56) References Cited

U.S. PATENT DOCUMENTS

| | | | |
|---|---|---|---|
| 3,619,347 A | 11/1971 | Ireland et al. .................. 162/5 |
| 4,643,800 A | 2/1987 | Maloney et al. ................ 162/5 |
| 4,650,906 A | 3/1987 | Murakami et al. ........... 564/498 |
| 4,997,523 A | 3/1991 | Pease et al. .................... 162/5 |
| 5,131,982 A | 7/1992 | St. John .................. 162/168.2 |
| 5,380,403 A | 1/1995 | Robeson et al. ............ 162/147 |
| 5,641,385 A | * 6/1997 | Croft et al. .................... 162/60 |
| 5,810,970 A | 9/1998 | Hughes et al. .............. 162/143 |

FOREIGN PATENT DOCUMENTS

| | | |
|---|---|---|
| DE | 43 21 819 | 1/1995 |
| JP | 0034650 | 3/1983 |
| JP | 405017414 | 1/1993 |
| WO | 95 29289 | 11/1995 |

OTHER PUBLICATIONS

The Merck Index 12th ed., Merck & Co., Inc., Whitehouse Station, NJ, 1996, p. 646 (entry #3841), 1996.*

Gessner G. Hawley, "The Condensed Chemical Dictionary", 1981, Tenth edition, pp. 347, 430, 1005 and 1047 Van Nostrand Reinhold Company Inc., New York XP002103959.

Derwent Abstract, AN 94–330639 XP002103961 & JP 06 257082 A (Honshu Paper Mfg Co Ltd), Sep. 13, 1994.

Derwent Abstract, AN 93–232903 XP002103962 & JP 05 156584 A (Honshu Paper Mfg Co Ltd), Jun. 22, 1993.

* cited by examiner

Primary Examiner—Brian J. Davis
(74) Attorney, Agent, or Firm—Dragan J. Karadzic; Tim Headley

(57) ABSTRACT

Ethyleneamine compound(s), or mixtures thereof, are used in effective amounts to reduce or inhibit the deposition of white pitch on the paper making equipment during the processing to recycle coated paper.

5 Claims, No Drawings

METHOD FOR INHIBITING THE DEPOSITION OF WHITE PITCH IN PAPER PRODUCTION

This application is a division of U.S. application Ser. No. 09/047,803, filed Mar. 25, 1998, now U.S. Pat. No. 6,153,049.

FIELD OF THE INVENTION

The present invention relates to the inhibition of the deposition of white pitch in paper production.

BACKGROUND OF THE INVENTION

Paper manufacture, in the simplest sense, involves producing a pulp from wood, slurrying the pulp and water, and forming a pulp mat, which is pressed and dried to form paper. In the critical forming step, the pulp/water slurry (furnish) is formed as a mat on the wire web of the paper machine. Excess water and fines (white water) pass through the mat on the wire and are recycled. The formed web goes forward into the press and dryer section of the machines where the mat becomes paper.

Broke paper is the term used in the paper industry to describe the paper which does not meet specifications and for that reason cannot be sold. This paper is usually recycled internally at the mill to recover fibers but it may also be sold to other mills as a source of fiber. The broke paper may be coated, the coating being applied to the base sheet of paper as it is manufactured. The broke paper which is coated is referred to as coated broke paper. Waste paper is the term used in the paper industry to describe paper which has been utilized by a consumer. It is often termed "post consumer waste." This paper is often collected and recycled at a mill to recover fibers. The waste paper may be coated, the coating being applied to the base sheet of paper as it is manufactured. The waste paper which is coated is referred to as coated waste paper. Coated paper that is recycled can be broke or waste paper. In recent years many paper mills have experienced problems with the recycling of coated paper because the coatings introduce materials which normally would not be present in the original stock of fibers used to manufacture the base paper sheet.

The coatings normally comprise various pigments and binders. Typical pigments used include many types of clay, calcium carbonate, titanium dioxide, and other specialty fillers. The problems of white pitch are thought to be mainly caused by the binders which include latex polymers derived from styrene-butadiene and polyvinyl acetate resins and natural binders such as starch.

White pitch problems have been known for some time in the paper producing industry. White pitch is sticky, light gray substance which is found as a deposit on metal surfaces in the in the wet-end, forming press, or dryer sections of the paper machine. It is termed "white" to distinguish it from the brown or black pitch, which results from materials contained in the wood. White pitch is also found in the white water system. At times the pitch deposits carbonize to give black deposits in the dryer section of the paper machine. The white pitch problem has been shown to be caused by the relatively high use of coated paper in the furnish of mills experiencing the problem. When coated paper is re-pulped, the clay or minerals and the latex in the coatings do not readily disperse into the pulp but form agglomerations, which result in white pitch. White pitch can coat the equipment or form defects in the paper if it travels into the paper machine with the pulp. High machine downtime, frequent cleaning, paper sheet defects such as holes, and increased number of sheet breaks are costly problems associated with white pitch deposits. Equipment clean up is quite involved because deposits can be found on the foils, table rolls, vacuum boxes, dryer cans and dryer felts, and throughout the press felts.

Various solutions have been suggested for dealing with the white pitch problem. Several deposit control chemicals are currently being used or evaluated by the paper industry. By trapping and dispersing the small latex particles in the sheet, the white pitch problem can be controlled. More specifically, the latex particles should be attached to the fibers immediately passing through the re-pulper. At this point the latex particles are small and anionic, and therefore, they can exit the system as part of a sheet. Due to the anionic character of both the latex particles and the fibers, an additive having low molecular weight and high cationic charge is best suited for this purpose. However, the additive alone may not be sufficient to contain the latex particles in the paper sheet and the use of a retention aid compatible with the additive may be important for successful control of white pitch.

Synthetic polymers are the most successful known anti-deposition additives for white pitch. They are highly cationic, enabling them to create a strong electrostatic bond between the fibers, the latex particles and the additive. Once bonded, the fiber will carry the latex particles through the mill, with the help of a retention aid, and the particles will become part of the finished paper. Medium molecular weight polyglycol, amine/glycol or polyethyleneimine polymers have been have been shown to be useful in reducing white pitch.

Some of the methods for treating white pitch problems are described in documents below.

U.S. Pat. No. 5,131,982 (Michael R. St. John) describes the use of DADMAC containing polymers and copolymers to treat cellulose fibers recycled from coated broke recovery to make them suitable for making paper.

U.S. Pat. No. 4,997,523 (Pease et al) describes the use of a tetrafunctional alkoxylated diamine in combination with a phosphate compound, phosphonate compound or phosphoric acid to minimize the deposition of white pitch on paper making equipment.

U.S. Pat. No. 4,643,800 (Maloney et al) describe the use an oxyethylene glycol nonionic surfactant in which one end hydroxyl group has been substituted with an aliphatic or alkylaromatic group and the other end hydroxyl group has been replaced with a polyoxypropylene group or a benzyl ether group in combination with a medium molecular weight (500-50,000) polyelectrolyte dispersant to remove and disperse contaminants from secondary fiber during re-pulping.

There are several disadvantages of the use of polymers to control white pitch. Polymers are not generally cost efficient. For example, polyethyleneimine (PEI), a tertiary amine polymer, is an effective white pitch control additive yet it is quite costly to use. Also, as the length of a polymer increases the chance of the polymer breaking down and releasing the latex particles also increases. Polymers can even cause deposits due to the difficulty in controlling the polymer from attaching latex particles to other latex particles. Moreover, polymers are not generally water soluble which limits their applicability.

There are other solutions used for control of white pitch. Talc was commonly used in the past and is still sometimes used to control deposits. As a surface-active filler, talc acts to control deposits by drying the area around the pitch particle so that it cannot attach to the paper making equipment. However, this offer only a temporary solution to the pitch problem which reappears as the process continues. Talc does not bind the latex particles to the fibers, and therefore when exposed to shear, new tacky areas appear causing deposits. Also, additives which react with the surface of the pitch particle to render it less tacky (detackifiers) offer temporary solution to controlling white pitch. As with talc, this solution fails when exposed to shear. Both talc and tackifiers can be effective only when used with a good retention aid. The objective of retention aids is to cause latex particles to repel each other which sends them through white water. Eventually, pitch is deposited on the pump impellers, tank walls, and agitators.

It is evident that there is a need in paper making industry for an improved method of controlling the white pitch problem experienced with the recycling of coated paper.

Surprisingly, it has now been found that the deposition of white pitch on the paper making equipment can be inhibited in a simple and effective manner by the addition of ethyleneamine compounds to the coated paper during the re-pulping operation.

DETAILED DESCRIPTION OF THE INVENTION

Accordingly, the present invention concerns a process for reducing or inhibiting the deposition of white pitch on paper making equipment during the processing of the recycled coated paper which method comprises adding to the coated paper during re-pulping an effective amount of at least one ethyleneamine compound.

In another aspect, the present invention concerns a composition for repulping coated paper comprising an effective amount of at least one ethyleneamine compound.

The term ethyleneamine as used in the present invention means an amine having at least one ethyleneamine unit or repeating ethyleneamine units. An ethyleneamine unit is —($CR_2$—$CR_2$—NH—)— wherein each R is independently selected from H or an alkyl (straight, branched or cyclic) group. R is preferably H. When R is alkyl group, it is preferred that the alkyl group contains from about 1 to about 10 carbon atoms. Ethyleneamines have at least two amine groups, which groups are primary or secondary amine groups. Tertiary amine groups may also be present in ethyleneamines.

Examples of ethyleneamines useful in the present invention include, but are not limited to, ethylenediamine, diethylenetriamine, triethylenetetramine, tetraethylenepentamine, piperazine, aminoethylpiperazine, ethyleneamine mixtures such as mixtures of ethyleneamine oligomers having an average molecular weight of about 250-300 commercially available from The Dow Chemical Company under the trade designation Ethyleneamine E-100, and other mixtures thereof. In the case of ethyleneamines having isomers, one isomer or a mixture of isomers is suitably used in the practice of the invention.

The concentration of the ethyleneamine compound(s) which has been found to be effective for reducing or inhibiting the deposition of white pitch is typically in the range of from about 10 ppm to about 5000 ppm, preferably from about 100 ppm to about 2500 ppm, more preferably from about 500 ppm to about 1500 ppm, of the ethyleneamine compound based upon total paper solids.

It should be understood that since the processing of the recycled coated paper may result in generation of problems and paper defects other than white pitch, the present invention may be used in conjunction with other additives commonly used in paper making process such as retention aids and conditioners.

The examples which follow are given to illustrate the invention and should not be interpreted as limiting it in any way. Unless stated otherwise, all parts and percentages are given by weight.

EXAMPLES

The effectiveness of the ethyleneamine compounds to inhibit or reduce the deposition of white pitch was evaluated in a test which measures the depositable material in coated paper broke. The test procedure is based on "TAPPI Useful Method 223: Determination of Depositable Material in Pulp and the Evaluation of Chemical Deposit Control Agents" method, published by the Technical Association of the Pulp and Paper Industry in "TAPPI Useful Methods," pp. 30–32, 1991. In this method, two stainless steel plates are made to vibrate in agitated solution of re-pulped coated paper and the additive to be tested. The pitch is measured by the net weight gain of the plates. Successful deposit control additives give a zero weight gain on the plates.

A Waring commercial blender was used to re-pulp the coated paper. The test apparatus comprised: (iv) a 4 liter polypropylene beaker; (ii) an overhead stirrer with a stainless steel shaft and propeller suspended in the beaker; (iii) a laboratory vibrating device, clamped to a stainless steel shaft (0.25 inch in diameter) with one end drilled and tapped 0.5 inch deep for an 0.25 machine screw, suspended in the beaker adjacent to the overhead stirrer; and (iv) two type 304 stainless steel plates (25 mils thick), trimmed to size 2.75×3.75 inches, and drilled on one end for an 0.25 inch machine screw attached to the stainless steel shaft with clamped vibrating device. Standard laboratory glassware and equipment were used for other experimental operations.

A 2.5 percent slurry was prepared using the commercial blender in the following manner. Distilled water (1800 ml) and the required amount of the additive were mixed in the blender. Shredded coated paper (45 g) was added and allowed to soak for 10 minutes. At the end of the 10 minute period, the mixture was blended for 75 seconds on the low setting. After blending, the mixture was poured into the 4 liter polypropylene beaker.

The stainless steel plates were scrubbed with diatomaceous earth (Celite 545), rinsed with distilled water and placed in laboratory oven. After removal from the oven, the plates were cooled to room temperature in a desiccator, weighed and attached to the shaft with the clamed vibrating device. The stainless steel shaft and the overhead stirrer were immersed in the slurry transferred to the beaker. The stainless steel shaft was then adjusted so that the plates did not interfere with the operation of the overhead stirrer. The overhead stirrer was started and the speed increased until the slurry moved slowly over the plates. Once the stirring velocity was stabilized, the vibrating device was started. After 30 minutes, both the overhead stirrer and the vibrating device were shut off. The plates were detached from the shaft, rinsed with distilled water and dried in the laboratory oven. After removal from the oven, the plates were cooled to room temperature in a desiccator, weighed and the net weight change for the set was recorded.

Ethylenediamine (EDA), diethylenetriamine (DETA), triethylenetetramine (TETA), tetraethylenepentamine (TEPA) and Ethyleneamine 100 (EA-100) were tested at the dose levels of 500, 1000 and 1500 ppm in the above described test procedure (using the aforementioned apparatus) three times at each dose level and the average pitch deposited was calculated. The concentrations of the additives were based upon the total coated paper solids in the slurry. Additionally, a known polymeric antideposition additive was tested as a comparative example in the same way as the ethyleneamines: polyethyleneimine of 1800 molecular weight (PEI). The results are given in Table I below.

TABLE 1

Results for the Evaluation of Deposit Control Additives

| Example | Additive | Avg. Net Pitch at 500 ppm | Avg. Net Pitch at 1000 ppm | Avg. Net Pitch at 1500 ppm |
|---|---|---|---|---|
| 1 | EDA | 0.0002 | 0.0003 | 0.0004 |
| 2 | DETA | 0.0002 | 0.0005 | 0.0003 |
| 3 | TETA | 0.0003 | 0.0001 | 0.0003 |
| 4 | TEPA | 0.0003 | 0.0003 | 0.0000 |
| 5 | E-100 | 0.0001 | 0.0000 | 0.0000 |
| C-1 | None | 0.0012 | 0.0012 | 0.0012 |
| C-2 | PEI | 0.0001 | 0.0001 | 0.0001 |

Note: Examples C-1 and C-2 are not examples of the present invention.

As can be seen from the data provided in Table 1, all tested ethyleneamine compounds reduced drastically the amount of pitch deposited. E-100 demonstrated to be the most effective in controlling pitch since it reduced the deposits by 100 percent at the 1000 ppm and 1500 ppm dose levels. On the other hand, the known pitch control polymer additive (PEI) reduced the deposits by only 92 percent at the same dose levels.

What is claimed is:

1. A predominantly aqueous liquid composition useful in repulping coated paper in conventional processing equipment, which composition comprises: pulp, white pitch, and one or more ethyleneamine compounds, the one or more ethyleneamine compounds being present in an effective amount to inhibit deposition of white pitch on the equipment.

2. The composition of claim 1 wherein the ethyleneamine compound is selected from the group consisting from ethylenediamine, diethylenetriamine, triethylenetetramine, tetraethylenepentamine, mixtures of ethyleneamine oligomers having a average molecular weight of about 60–500, and mixtures thereof.

3. The composition of claim 1 wherein the ethyleneamine compound is present in an amount from about 10 parts per million to about 5000 parts per million.

4. The composition of claim 1 wherein the ethyleneamine compound is present in an amount from about 100 parts per million to about 2500 parts per million.

5. The composition of claim 1 wherein the ethyleneamine compound is present in an amount from about 500 parts per million to about 1500 parts per million.

* * * * *